W. M. MILLIGAN.
GRINDING MACHINE.
APPLICATION FILED FEB. 19, 1920.
1,354,456.
Patented Sept. 28, 1920.
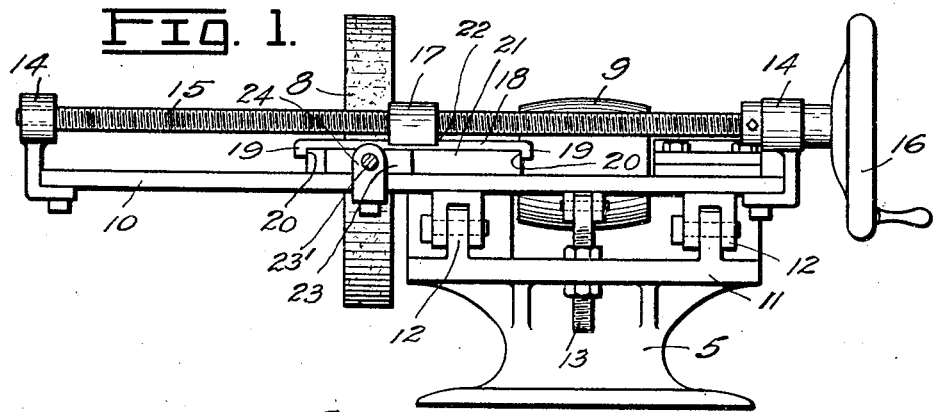
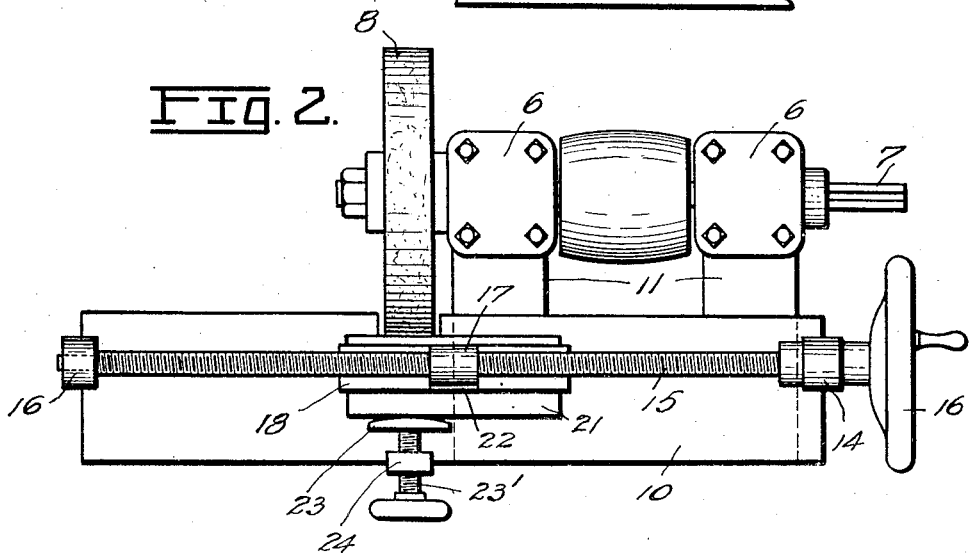
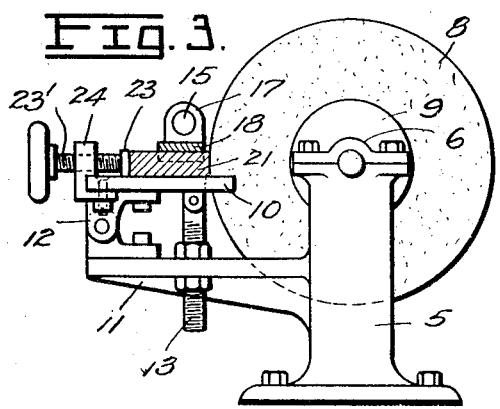
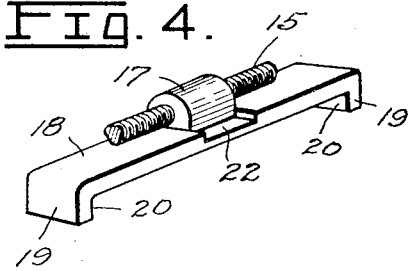
Inventor:
Walker M. Milligan
By his Attorney
Pierre Barnes

UNITED STATES PATENT OFFICE.

WALKER M. MILLIGAN, OF SEATTLE, WASHINGTON.

GRINDING-MACHINE.

1,354,456.  Specification of Letters Patent.  Patented Sept. 28, 1920.

Application filed February 19, 1920. Serial No. 360,007.

*To all whom it may concern:*

Be it known that I, WALKER M. MILLIGAN, a citizen of the United States, residing at Seattle, in the county of King and State of Washington, have invented certain new and useful Improvements in Grinding-Machines, of which the following is a specification.

This invention relates to grinding machines and particularly to that class which are employed in grinding and sharpening cutter blades or the like for planers or metal shearing machines.

The object of the present invention is the provision of simple, efficient and inexpensively constructed devices for holding and feeding the work in operative position while being ground.

With these and other ends in view the invention consists in the novel construction, adaptation and combination of parts as will be hereinafter described and claimed.

In the accompanying drawings, Figure 1 is a front elevational view of a machine embodying my invention. Fig. 2 is a plan view and Fig. 3 is an end elevational view of the same. Fig. 4 is a detail perspective view of the work carrier and the feed screw connections therewith.

In said drawings, the reference numeral 5 represents a standard provided with journal boxes 6 for an arbor 7 upon an end of which is mounted an abrasive wheel 8 of emery or other suitable material.

Also mounted upon said arbor is a pulley 9 for an endless power driven belt, not shown.

10 represents a table of rectangular shape arranged parallel to the arbor 7 and is supported by bracket elements 11 of the standard 5 as by means of hinge connections 12 adjacent to the outer edge of the table and a regulating screw 13 engaging the table adjacent to its inner side whereby the table may be adjusted and held in either horizontal or inclined positions.

Journaled in boxes 14 at each end of table 10 is a feed screw 15 arranged parallel to the arbor 7 and above the table. Said feed screw may be manually rotated as by means of a hand wheel 16, or otherwise, to impart longitudinal movements to a nut 17 whereby corresponding movements are imparted to a carrier 18. Said carrier consists in a bar provided with downwardly extending extremities or lugs 19 having their opposing faces 20 disposed to accommodate there between the work, such as blade 21, which is to be ground. In the top of the carrier 18 is a transverse groove 22 in which the aforesaid nut 17 fits to afford relative movements of the carrier toward or from the abrasive wheel 8. 23 represents a guide block connected to the end of a screw $23^1$ which passes through a threaded aperture provided in a lug 24 extending upwardly from the table 10. The screw $23^1$ is disposed, desirably, at right angles to the axis of the feed screw 15 and in proximity to the top surface of the table.

In operation, the article 21 to be ground is placed upon the table 10 below the carrier so that the ends of the article will be engaged by the carrier lugs 19 whereby the work is movable at right angles to the feed screw 15 either in unison with or independently of the carrier.

The work guiding block 22 is then regulated by means of screw 23 to a predetermined distance from the grinding wheel, whereupon the feed screw 15 is actuated to impart a traversing movement to the work through the medium of the carrier thereby effecting the grinding of the work to dress or sharpen the same.

What I claim, is—

1. In a machine of the character described, a work-supporting table, a carrier comprising a bar provided with downwardly directed extremities to straddle the work, a screw for imparting feed movements to said carrier in a direction longitudinally of said table, and a second screw arranged to impart sliding feed movements to the work within the space between the extremities of said carrier and independently of the latter and with respect to said table.

2. In a machine of the character described, the combination with the machine frame, an abrasive wheel and the arbor therefor, of a table tiltably connected to said frame, means to regulate the tiltable position of the table, adjustable work guiding means provided upon the table, a work carrier, a feed screw disposed in parallel relations with said arbor, and a nut for said feed screw, said nut being connected to said carrier to afford movements to the latter toward or from the wheel axis independently of the nut.

Signed at Seattle, Washington, this 10th day of February 1920.

WALKER M. MILLIGAN.

Witnesses:
 PIERRE BARNES,
 ELIZABETH JOHNSON.